United States Patent
Cai et al.

(10) Patent No.: US 11,585,893 B2
(45) Date of Patent: Feb. 21, 2023

(54) MULTI-TARGET DYNAMIC SIMULATION TEST SYSTEM FOR VEHICLE-MOUNTED MILLIMETER-WAVE RADAR

(71) Applicant: Jilin University, Jilin (CN)

(72) Inventors: Kunyang Cai, Jilin (CN); Ting Qu, Jilin (CN); Bingzhao Gao, Jilin (CN); Wenqi Qu, Jilin (CN); Sihan Liu, Jilin (CN)

(73) Assignee: JILIN UNIVERSITY, Jilin (CN)

( * ) Notice: Subject to any disclaimer, the term of this patent is extended or adjusted under 35 U.S.C. 154(b) by 418 days.

(21) Appl. No.: 16/876,968

(22) Filed: May 18, 2020

(65) Prior Publication Data
US 2020/0371207 A1  Nov. 26, 2020

(30) Foreign Application Priority Data
May 21, 2019 (CN) .......................... 201910421089.1

(51) Int. Cl.
*G01S 7/40* (2006.01)
*H01Q 3/08* (2006.01)

(52) U.S. Cl.
CPC ............. *G01S 7/4052* (2013.01); *H01Q 3/08* (2013.01); *G01S 7/4069* (2021.05)

(58) Field of Classification Search
CPC .... G01S 7/4052; G01S 7/4069; G01S 7/4026; G01S 7/4086; H01Q 3/08
See application file for complete search history.

(56) References Cited

U.S. PATENT DOCUMENTS

| | | | | |
|---|---|---|---|---|
| 5,066,921 A | * | 11/1991 | Rope | G01R 29/10 343/703 |
| 5,247,843 A | * | 9/1993 | Bryan | F41G 7/002 342/170 |
| 2007/0222673 A1 | * | 9/2007 | Gounalis | G01S 7/021 342/165 |
| 2012/0235858 A1 | * | 9/2012 | Dougherty | G01S 7/4026 342/169 |
| 2014/0070981 A1 | * | 3/2014 | Kim | G01S 7/4052 342/171 |
| 2015/0192241 A1 | * | 7/2015 | Shannahan | F16H 7/14 248/178.1 |
| 2017/0227627 A1 | * | 8/2017 | Chanda | G01S 7/4052 |

* cited by examiner

*Primary Examiner* — Donald H B Braswell
(74) *Attorney, Agent, or Firm* — Burns & Levinson, LLP; Joseph M. Maraia (57) ABSTRACT

A multi-target dynamic simulation test system for vehicle-mounted millimeter-wave (MMW) radar. The test system includes an antenna turntable, a radar pan-and-tilt head (PTH), a radar echo simulation module, a control module, a signal acquisition module and a display. A test radar is driven by the radar PTH to pan or tilt. The radar PTH and the test radar are both placed in a darkroom module. An antenna is driven by the antenna turntable to pan. The control module sends expected states of the test radar and the antennas to the radar PTH and the antenna turntable, respectively, and sends relative states between host vehicle and virtual targets to the test radar after processing by the radar echo simulation module. The signal acquisition module acquires and stores a detection signal of the test radar, and transmits the detection signal of the test radar to the display for real-time display.

4 Claims, 4 Drawing Sheets

MULTI-TARGET DYNAMIC SIMULATION TEST SYSTEM FOR VEHICLE-MOUNTED MILLIMETER-WAVE RADAR

TECHNICAL FIELD

The present invention belongs to the technical field of vehicle-mounted radar testing, and particularly relates to a multi-target dynamic simulation test system for vehicle-mounted millimeter-wave (MMW) radar.

BACKGROUND

The rapid development of automotive intelligence has made automated driving technology an area of increasing concern. Environmental perception is an indispensable part of automated driving, and environmental perception sensors are developing rapidly. Among them, the millimeter-wave (MMW) radar is insusceptible to light, weather and environment, and thus indispensable for smart cars to perceive the environment. The MMW radar can effectively judge the road conditions and improve the vehicle's early warning ability. Therefore, it is widely used in advanced driving assistance systems such as lane keeping, adaptive cruise, collision warning, blind spot monitoring and lane change assistance. In order to test whether the MMW radar is suitable for complex driving environments and can achieve the required performance, it is necessary to build a MMW radar test system.

At present, there are two types of radar test systems. One is to arrange an actual test site to test, which is expensive. The other is to build a virtual test scenario through simulation, which has low cost and convenient testing. However, both types can only test simple driving scenarios, and are difficult to determine whether the MMW radar can meet the perception requirements in complex driving scenarios.

SUMMARY

In view of the above-mentioned defects in the prior art, the present invention provides a multi-target dynamic simulation test system for vehicle-mounted millimeter-wave (MMW) radar. The invention realizes the performance test of MMW radar in complex driving scenarios through the dynamic simulation of targets and the posture of the host vehicle. The technical solutions of the present invention are described below with reference to the accompanying drawings of the specification.

A multi-target dynamic simulation test system for a MMW radar, including: an antenna turntable, a radar pan-and-tilt head (PTH), a radar echo simulation module, a control module, a signal acquisition module and a display, where a test radar is mounted on the radar PTH and driven by the radar PTH to pan or tilt; the test radar is placed in a darkroom module of the antenna turntable; antennas are driven by the antenna turntable to pan;

the radar echo simulation module includes a radio frequency (RF) input unit, a signal processing unit and a RF output unit which are signal-connected in order; the RF input unit and the RF output unit are respectively signal-connected to the antennas;

the control module includes a host controller which is respectively connected to a radar PTH control unit, an antenna turntable control unit and an echo simulation control unit; the radar PTH control unit is connected to the radar PTH in a manner of control; the antenna turntable control unit is connected to the antenna turntable in a manner of control; the echo simulation control unit is signal-connected to the signal processing unit; the host controller sends an expected pan angle and tilt angle of the test radar to the radar PTH through the radar PTH control unit, sends an expected pan angle of the antenna in the antenna turntable to the antenna turntable through the antenna turntable control unit, and sends the distance and relative speed between the host vehicle carrying the test radar and virtual target vehicles, processed by the signal processing unit, to the test radar through the antennas;

the signal acquisition module is connected to the display after being signal-connected to the test radar; the signal acquisition module acquires and stores a detection signal of the test radar, and transmits the detection signal of the test radar to the display for real-time display.

Further, the antenna turntable includes an antenna movement module and a darkroom module; the darkroom module is located in the antenna movement module, and both the radar PTH and the test radar fixed thereon are placed in the darkroom module;

the antenna movement module includes antenna turntable small pulleys 101, antenna turntable synchronous belts 102, an antenna turntable stand 103, antenna turntable large pulleys 104, sliding bearings 105, wear-resistant washers 108, antennas 109, antenna turntable servo motors 111, an antenna turntable end cover 112 and waveguides 113; multiple antenna turntable large pulleys 104 are sleeved outside a circumference of a sleeve in the middle of the antenna turntable stand 103 through the sliding bearing 105; the antenna turntable large pulleys 104 rotate independently with each other; the wear-resistant washer 108 is disposed between end faces of two adjacent antenna turntable large pulleys 104; the antenna turntable end cover 112 is fixed on the top of the sleeve of the antenna turntable stand 103, thereby realizing the axial fixation of the antenna turntable large pulleys 104; there are multiple antenna turntable servo motors 111 fixedly mounted on a vertical stand on one side of the antenna turntable stand 103, which are corresponding to the antenna turntable large pulleys 104 one to one; the output terminal of each antenna turntable servo motor 111 is coaxially fixed with an antenna turntable small pulley 101; each antenna turntable small pulley 101 is connected to an antenna turntable large pulley 104 in a manner of transmission through the antenna turntable synchronous belt 102; antennas 109 are horizontally fixed to the antenna turntable large pulleys 104 in one-to-one correspondence; one end of the antenna 109 passes through the antenna turntable large pulley 104 to enter a wave-absorbing ring 106 inside the sleeve of the antenna turntable stand 103; the other end of the antenna 109 is connected to the RF input unit and the RF output unit through a waveguide 113;

the darkroom module has a semi-closed cavity composed of wave-absorbing rings 106 and a wave-absorbing wedge 107; the wave-absorbing rings 106 is mounted from bottom to top on an inner wall of the sleeve of the antenna turntable stand 103; the wave-absorbing wedge 107 is fixedly mounted on the bottom of the antenna turntable end cover 112; the radar PTH and the test radar mounted thereon enter the cavity of the darkroom module through a through hole in the middle of the antenna turntable stand 103;

the antenna turntable servo motor 111 is signal-connected to the antenna turntable control unit.

Further, the radar PTH includes a radar clamping module and a radar movement module;

the radar clamping module includes a radar clamping baffle 201, a radar clamping bracket 211 and a radar clamping bottom plate 202; the radar clamping bracket 211 is vertically fixed on the radar clamping bottom plate 202; the radar clamping baffle 201 is fixed to a front end of the radar clamping bracket 211; the radar clamping baffle 201 is opened with matrix distributed strip-shaped mounting holes; the test radar is fixedly mounted on the radar clamping baffle 201 through the strip-shaped mounting holes;

the radar movement module includes a panning small pulley 203, a panning synchronous belt 204, a thrust ball bearing 205, a radar PTH end cover 206, a radar PTH upper turntable 207, a spline shaft 208, a tilting small pulley 209, a tilting servo motor 210, a panning large pulley 212, a panning servo motor 213, a tilting large pulley 214 and a radar PTH lower turntable 215; the panning large pulley 212 is mounted above the radar PTH upper turntable 207 through the thrust ball bearing 205; the bottom of the panning large pulley 212 is fixed on the radar PTH upper turntable 207 through the radar PTH end cover 206 to achieve axial fixation, and the panning large pulley 212 is coaxially fixed to the bottom of the radar clamping bottom plate 202; the panning servo motor 213 is fixed to the radar PTH upper turntable 207; the panning small pulley 203 is coaxially fixed to an output terminal of the panning servo motor 213; the panning small pulley 203 is connected to the panning large pulley 212 in a manner of transmission through the panning synchronous belt 204; the bottom of the radar PTH upper turntable 207 is hinged to the top of the radar PTH lower turntable 215; the tilting large pulley 214 is connected to the bottom of the radar PTH upper turntable 207 through the spline shaft 208, and a hinge axis of the radar PTH upper turntable 207 and the radar PTH lower turntable 215 is collinear with an axis of the spline shaft 208; an outer casing of the tilting servo motor 210 is fixed on a base of the radar PTH lower turntable 215; the tilting small pulley 209 is coaxially fixed to an output terminal of the tilting servo motor 210; the tilting small pulley 209 is connected to the tilting large pulley 214 in a manner of transmission through the tilting synchronous belt;

the tilting servo motor 210 and the panning servo motor 213 are respectively signal-connected to the radar PTH control unit.

Compared with the prior art, the present invention has the following beneficial effects.

1. In the present invention, a darkroom module of the test system for vehicle-mounted MMW radar includes multiple movable wave-absorbing rings, and is integrated with an antenna turntable. In the darkroom, there are only antennas rotating with wave-absorbing ring, a test radar and a radar clamping device, which greatly reduces clutter interference in a test environment.

2. In the present invention, the antenna turntable with multiple antennas, a radar PTH with two degrees of freedom (DOF) of rotation and a radar echo simulation module cooperate to achieve the real-time dynamic simulation of multiple targets in a complex driving scenario.

3. In the present invention, the test system for vehicle-mounted MMW radar is highly integrated and occupies a small space. It can conveniently and quickly complete the performance test of the MMW radar in various complex driving scenarios through simulation indoors.

REFERENCE NUMERALS 101. antenna turntable small pulley, 102. antenna turntable synchronous belt, 103. antenna turntable stand, 104. antenna turntable large pulley, 105. sliding bearing, 106. wave-absorbing ring, 107. wave-absorbing wedge 108. wear-resistant washer, 109. antenna, 111. antenna turntable servo motor, 112. antenna turntable end cover, 113. waveguide, 201. radar clamping baffle, 202. radar clamping bottom plate, 203. panning small pulley, 204. panning synchronous belt, 205. thrust ball bearing, 206. radar PTH end cover, 207. radar PTH upper turntable, 208. spline shaft, 209. tilting small pulley, 210. tilting servo motor, 211. radar clamping bracket, 212. panning large pulley, 213. panning servo motor, 214. tilting large pulley 215. radar PTH lower turntable, and 3. radar echo simulation module.

DETAILED DESCRIPTION

In order to clearly and completely illustrate the technical solutions of the present invention, the specific implementations of the present invention are described below with reference to the accompanying drawings of the specification.

Figure 1:
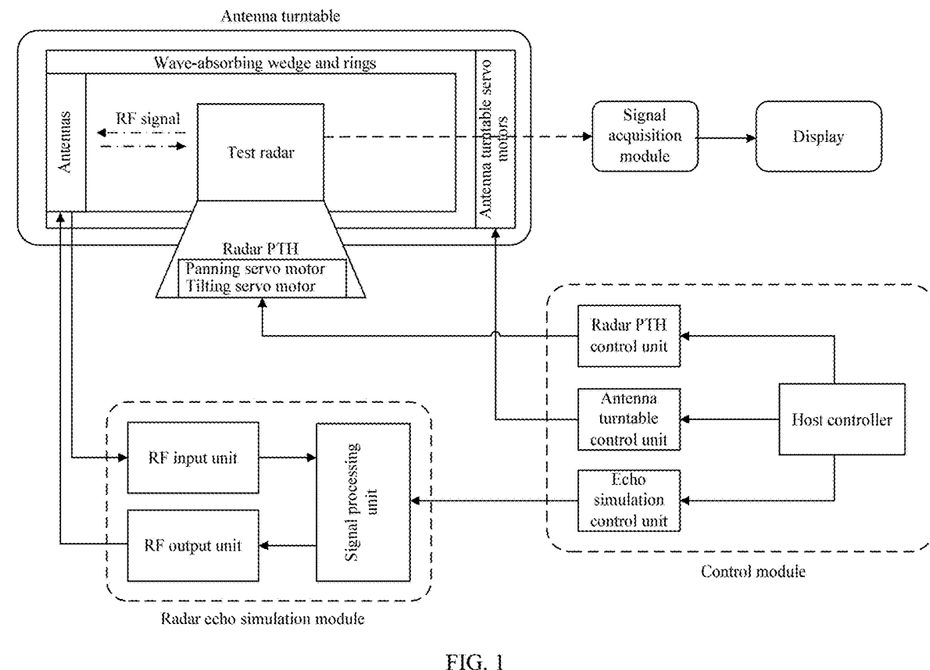
FIG. 1 is a schematic diagram of an overall structure of a test system for vehicle-mounted millimeter-wave (MMW) radar according to the present invention.

As shown in FIG. 1, the present invention discloses a multi-target dynamic simulation test system for vehicle-mounted millimeter-wave (MMW) radar. The test system includes an antenna turntable, a radar PTH, a radar echo simulation module, a control module, a signal acquisition module and a display. A test radar is mounted on the radar PTH and driven by the radar PTH to pan and tilt from front to back, so as to simulate a change in a driving posture and direction of a vehicle equipped with the test radar. Both the radar PTH and the test radar are placed in a darkroom module of the antenna turntable. The antenna turntable realizes the panning of antennas to simulate changes in angles between the vehicle with the test radar and target vehicles in a driving scenario. The antenna turntable is signal-connected to the radar echo simulation module. The radar echo simulation module acquires a radio frequency (RF) signal of the test radar, and sends an echo signal of the virtual target to the test radar. The control module is signal-connected to the antenna turntable, the radar PTH and the radar echo simulation module, respectively. The control module controls the antenna turntable and the radar PTH to move, and sends the echo signal of the virtual target to the antenna turntable through the radar echo simulation module, which is finally transmitted to the test radar through the antenna. The signal acquisition module is connected to the display after being signal-connected to the test radar. The signal acquisition module acquires and stores a detection signal of the test radar, and transmits the detection signal of the test radar to the display for real-time display.

Figure 2:
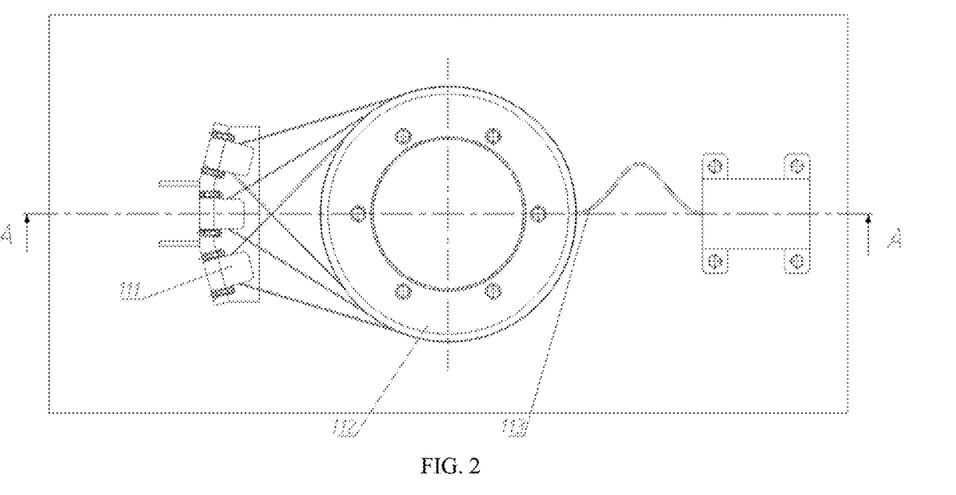
FIG. 2 is a top view of an antenna turntable of a test system for vehicle-mounted MMW radar according to the present invention.
Figure 3:
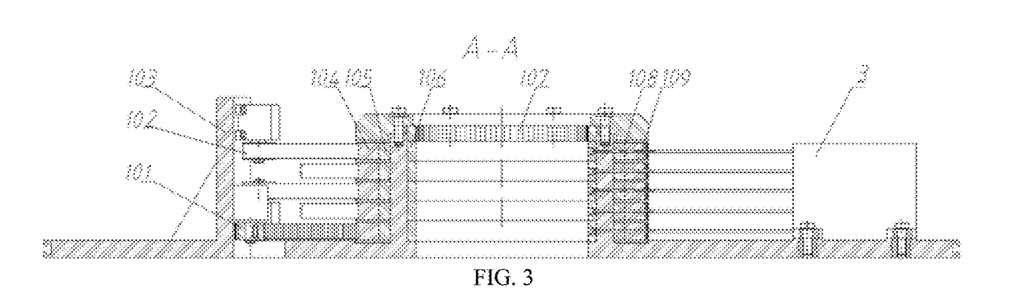
FIG. 3 is a sectional view taken along line A-A of FIG. 2.

As shown in FIG. 2 and FIG. 3, the antenna turntable includes an antenna movement module and a darkroom module. The antenna movement module drives the antennas to pan to simulate angle changes of the target vehicles. The darkroom module is located in the antenna movement module, and the radar PTH and the test radar fixed thereon are both placed in the darkroom module.

The antenna movement module includes an antenna turntable small pulley 101, an antenna turntable synchronous belt 102, an antenna turntable stand 103, an antenna turntable large pulley 104, a sliding bearing 105, a wear-resistant washer 108, an antenna 109, an antenna turntable servo motor 111, an antenna turntable end cover 112 and a waveguide 113. The antenna turntable stand 103 is disposed horizontally. A vertical stand is provided on an upper surface of one side of the antenna turntable stand 103. A through hole is opened in the middle of the antenna turntable stand 103, and a cylindrical sleeve is provided above the through hole. The number of antenna turntable large pulleys 104 is the maximum number of target vehicles that can be simulated. In this example, there are five antenna turntable large pulleys 104, and the five antenna turntable large pulleys 104 are sequentially sleeved outside a circumference of the sleeve of the antenna turntable stand 103 in an axial direction through the sliding bearing 105. The five antenna turntable large pulleys 104 rotate independently with respect to the sleeve. The wear-resistant washer 108 is disposed between end faces of two adjacent antenna turntable large pulleys 104. The antenna turntable end cover 112 is fixedly mounted on the top of the sleeve of the antenna turntable stand 103 by screws. An end face of the antenna turntable end cover 112 axially presses the antenna turntable large pulley 104 on the sleeve of the antenna turntable stand 103, thereby realizing the axial fixation of the antenna turntable large pulley 104. There are five antenna turntable servo motors 111 fixedly mounted on the vertical stand of the antenna turntable stand 103, which are corresponding to the antenna turntable large pulleys 104 one to one. The output terminal of each antenna turntable servo motor 111 is coaxially fixed with an antenna turntable small pulley 101. Each antenna turntable small pulley 101 is connected to an antenna turntable large pulley 104 in a manner of transmission through an antenna turntable synchronous belt 102 to form a belt transmission pair of the antenna turntable. Antennas 109 are horizontally fixed along the antenna turntable large pulleys 104 in one-to-one correspondence. One end of each antenna 109 passes through an antenna turntable large pulley 104 to enter the dark room module inside the sleeve of the antenna turntable stand 103. Driven by the antenna turntable servo motors 111, each belt transmission pair of the antenna turntable drives an antenna turntable large pulley 104 to pan, thereby realizing the panning of the antennas 109. The other end of each antenna 109 is signal-connected to the radar echo simulation module through the waveguide 113.

The darkroom module is disposed inside the sleeve of the antenna turntable stand 103 and includes wave-absorbing rings 106 and wedge wave-absorbing wedge 107. The wave-absorbing rings 106 are sequentially, axially fixed from bottom to top on an inner wall of the sleeve of the antenna turntable 103. The wave-absorbing wedge 107 is fixedly mounted on the bottom of the antenna turntable end cover 112. The wave-absorbing rings 106 and the absorbing wedge 107 constitute a relatively closed cavity of the darkroom module. Each antenna 109 extends into a wave-absorbing ring 106. The radar PTH and the test radar mounted thereon enter the sleeve of the antenna turntable stand 103 through the through hole in the middle of the antenna turntable stand 103, and are placed in the darkroom module. This arrangement reduces clutter interference in a radar test environment.

Figure 4:
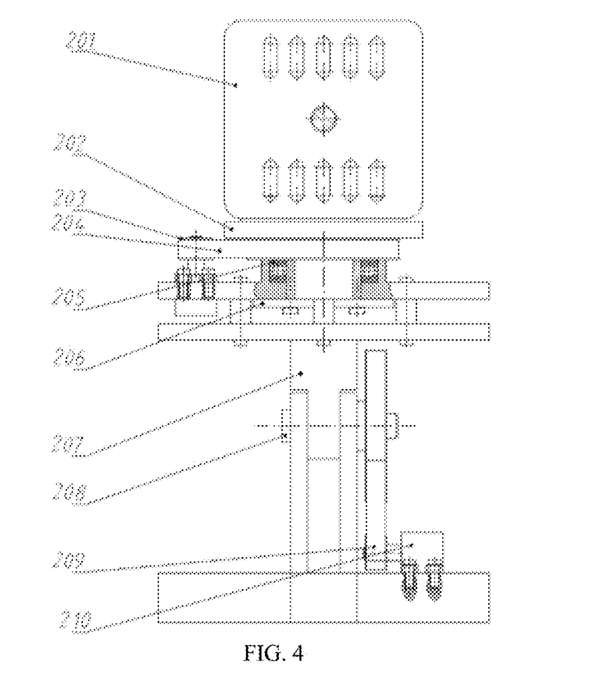
FIG. 4 is a front view of a radar PTH of a test system for vehicle-mounted MMW radar according to the present invention.
Figure 5:
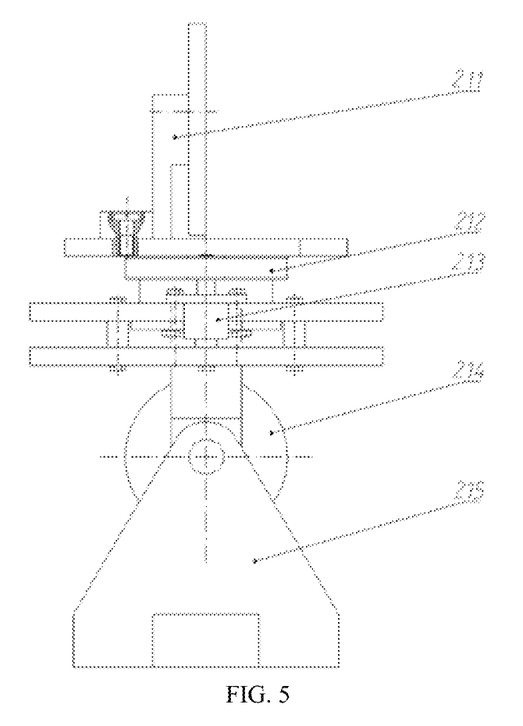
FIG. 5 is a side view of a radar PTH of a test system for vehicle-mounted MMW radar according to the present invention.

As shown in FIG. 4 and FIG. 5, the radar PTH includes a radar clamping module and a radar movement module. The test radar is fixed on the radar clamping module. The radar movement module is mounted below the radar clamping module, and drives the radar clamping module to pan or tilt the test radar thereon.

The radar clamping module includes a radar clamping baffle 201, a radar clamping bracket 211 and a radar clamping bottom plate 202. The radar clamping bracket 211 is vertically mounted on an upper surface of the radar clamping bottom plate 202 which is horizontally disposed. The bottom of the radar clamping bracket 211 is fixed on the radar clamping bottom plate 202 by screws. The radar clamping baffle 201 is vertically arranged above the radar clamping bottom plate 202, and a rear surface of the radar clamping baffle 201 is fixedly connected to a front end of the radar clamping bracket 211. The radar clamping baffle 201 is vertically opened with two rows of strip-shaped mounting holes. The test radar is fixedly mounted on the radar clamping baffle 201 through the strip-shaped mounting holes, and the mounting distance and position of the test radar with different sizes are adjusted through the strip-shaped mounting holes.

The radar movement module includes a panning small pulley 203, a panning synchronous belt 204, a thrust ball bearing 205, a radar PTH end cover 206, an radar PTH upper turntable 207, a spline shaft 208, a tilting small pulley 209, a tilting servo motor 210, a panning large pulley 212, a panning servo motor 213, a tilting large pulley 214 and a radar PTH lower turntable 215. The panning large pulley 212 is axially, vertically arranged below the radar clamping module, and rotatably mounted above the radar PTH upper turntable 207 through the thrust ball bearing 205. The bottom of the panning large pulley 212 is fixed on the radar PTH upper turntable 207 through the radar PTH end cover 206 to achieve axial fixation, and the panning large pulley 212 is coaxially fixed to the bottom of the radar clamping bottom plate 202. An outer casing of the panning servo motor 213 is fixedly mounted on the radar PTH upper turntable 207. The panning small pulley 203 is coaxially fixed to an output terminal of the panning servo motor 213. The panning small pulley 203 is connected to the panning large pulley 212 in a manner of transmission through the panning synchronous belt 204 to form a panning transmission pair. Driven by the panning servo motor 213, the panning transmission pair drives the radar clamping bottom plate 202 to pan, thereby driving the test radar to pan. The bottom of the radar PTH upper turntable 207 is hinged to the top of the radar PTH lower turntable 215. The tilting large pulley 214 is connected to the bottom of the radar PTH upper turntable 207 through the spline shaft 208, and a hinge axis of the radar PTH upper turntable 207 and the radar PTH lower turntable 215 is collinear with an axis of the spline shaft 208. An outer casing of the tilting servo motor 210 is fixedly mounted on a base of the radar PTH lower turntable 215. The tilting small pulley 209 is coaxially fixed to an output terminal of the tilting servo motor 210. The tilting small pulley 209 is connected to the tilting large pulley 214 in a manner of transmission through the tilting synchronous belt to form a tilting transmission pair. Driven by the tilting servo motor 210, the tilting transmission pair drives radar PTH upper turntable 207 to tilt from front to back, thereby driving the test radar to tilt from front to back.

During a test, the test system simulates a change in an attitude and a driving direction of the vehicle equipped with the test radar by the movement of the radar movement module of the radar PTH according to a preset test scenario, and simulates changes in relative angles between the vehicle and other vehicles in the driving scenario according to the movement of the antenna movement module of the antenna turntable.

As shown in FIG. 1, the radar echo simulation module includes a RF input unit, a RF output unit and a signal processing unit. The signal output terminal of each antenna 109 in the antenna turntable module is connected to a signal input terminal of the RF input unit. The signal output terminal of the RF input unit is connected to the first signal input terminal of the signal processing unit. The signal output terminal of the signal processing unit is connected to the signal input terminal of the RF output unit. Each signal output terminal of the RF output unit is connected to the signal input terminal of each antenna 109.

As shown in FIG. 1, the control module includes an echo simulation control unit, an antenna turntable control unit, a radar PTH control unit and a host controller. The host controller calculates the following data in real time: an expected pan angle and front/back tilt angle of the test radar, an expected pan angle of each antenna in the antenna turntable, and a relative distance and speed between the vehicle carrying the test radar and each other virtual target vehicle. The first signal output terminal of the host controller is connected to the signal input terminal of the radar PTH control unit. Two signal output terminals of the radar PTH control unit is respectively connected to a control signal input terminal of the panning servo motor and the tilting servo motor of the radar PTH. During a test, the host controller sends the expected pan angle and front/back tilt angle of the test radar to the radar PTH control unit, and the radar PTH control unit controls the panning servo motor and the tilting servo motor of the radar PTH to work, so as to realize the control of the pan angle and the front/back tilt angle of the test radar on the radar PTH. The second signal output terminal of the host controller is connected to the signal input terminal of the antenna turntable control unit, and each signal output terminal of the antenna turntable control unit is respectively connected to the control signal input terminal of each servo motor of the antenna turntable. During a test, the host controller sends the expected pan angle of each antenna in the antenna turntable to the antenna turntable control unit, and the antenna turntable control unit controls each servo motor of the antenna turntable to work, so as to realize the control of the pan angle of each antenna fixed on an antenna turntable large pulley corresponding to each servo motor. The third signal output terminal of the host controller is connected to the signal input terminal of the echo simulation control unit, and the signal output terminal of the echo simulation control unit is connected to the second signal input terminal of the signal processing unit in the radar echo simulation module. During a test, the host controller sends the relative distance and speed between the vehicle carrying the test radar and other virtual target vehicles to the echo simulation control unit, and the echo simulation control unit sends a to-be-transmitted time delay and frequency change of the echo signal relative to the RF signal of the test radar to the signal processing unit, so as to realize the simulation of the relative distance and speed of the virtual target vehicles.

During a test, the RF signal of the test radar is transmitted to the RF input unit through the antennas, and the RF input unit transmits the RF signal of the test radar to the signal processing unit. The signal processing unit generates the echo signals of the virtual targets in the preset driving scenario according to the to-be-transmitted time delay and frequency change of the echo signals relative to the RF signal of the test radar output by the echo simulation control unit, and transmits the echo signals of the virtual targets to the RF output module, which is finally transmitted to the test radar through the antennas. The signal processing unit generates the distance and speed of the virtual targets by simulation while simulating the echoes of the virtual targets. The signal processing unit first performs down-conversion processing on a received signal to change the signal into an intermediate frequency (IF) signal. Then the distance of the virtual targets is introduced through delay lines in the signal processing unit, and the speed of the virtual targets is simulated by introducing Doppler frequency shift (DFS). The processed IF signal is up-converted and transmitted to the antennas through the RF output unit. Finally, the echo signals of the virtual targets are transmitted to the test radar through the antennas.

As shown in FIG. 1, a signal output terminal of the test radar is connected to a signal input terminal of the signal acquisition module, and a signal output terminal of the signal acquisition module is connected to a signal input terminal of the display. During a test, the signal acquisition module acquires and stores a detection signal of the test radar, and transmits the detection signal to the display for real-time display. The radar signal data is stored for later radar performance analysis.

Figure 6:
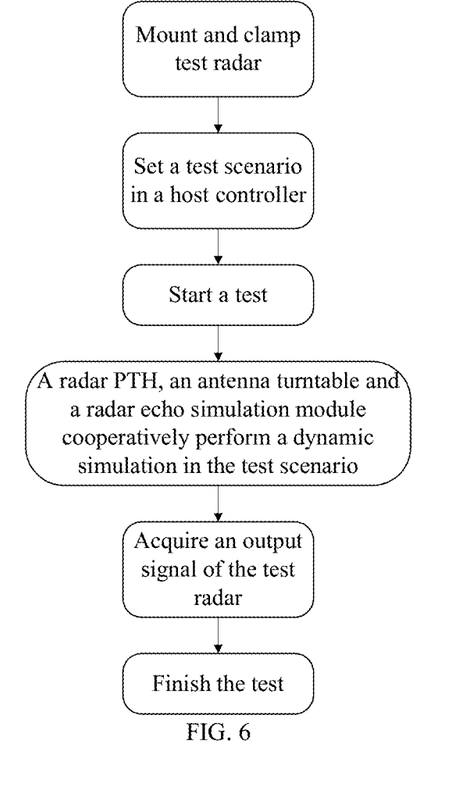
FIG. 6 is a flowchart of a test process of a test system for vehicle-mounted MMW radar according to the present invention.

A specific working process of the multi-target dynamic simulation test system for vehicle-mounted MMW radar according to the present invention, as shown in FIG. 6, is as follows:

Step 1: The radar clamping device is adjusted according to the size of the test radar, so that the test radar is located on a centerline of rotation of the radar PTH.

Step 2: A tester sets up a test scenario in the host controller.

Step 3: In the beginning of a test, the host controller controls the radar PTH control unit, the antenna turntable control unit and the echo simulation control unit to cooperate in real time. The radar PTH control unit controls the panning servo motor and the tilting servo motor of the radar PTH to realize the panning and tilting of the radar movement module, and the radar movement module drives the test radar to move together. The antenna turntable control unit controls the antenna turntable servo motors to realize the rotation of the antenna movement module, and the antenna movement module drives the antennas to move together. The echo simulation control unit controls the radar echo simulation module so that the antennas emit the same RF signal as the reflected echo signal of the targets in the preset test scenario. Through the above cooperative processes, the dynamic simulation of the test scenario is realized.

Step 4: During the test, the signal acquisition module acquires and records an output signal of the test radar, that is, a detection result of the targets by the test radar in the preset test scenario.

Step 5: After the test, the performance of the test radar is analyzed by the radar detection data acquired by the signal acquisition module.

In summary, the test system according to the present invention simulates the changes in the posture and driving direction of the host vehicle and those in the relative angle between the host vehicle and other vehicles in the test scenario through the antenna turntable and the radar PTH. The test system also simulates the relative distance and speed between the host vehicle and other vehicles in the test scenario through the radar echo simulation module. In this way, the test system cooperatively implements the dynamic simulation of the preset test scenario. The test system of the present invention can dynamically simulate various multi-target complex driving scenarios, and can conveniently and quickly implement the performance test of the MMW radar in various complex driving scenarios.

What is claimed is:

1. A multi-target dynamic simulation test system for vehicle-mounted millimeter-wave (MMW) radar, comprising:
    an antenna turntable, a radar pan-and-tilt head (PTH), a radar echo simulation device, a control device, a signal acquisition device, and a display, wherein:
    a test radar is mounted on the radar PTH and driven by the radar PTH to pan or tilt; the test radar is placed in a darkroom of the antenna turntable; antennas are driven by the antenna turntable to pan;
    the radar echo simulation device includes a radio frequency (RF) input apparatus, a signal processor, and a RF output apparatus which are signal-connected in order; the RF input apparatus and the RF output apparatus are respectively signal-connected to the antennas;
    the control device comprises a host controller which is respectively connected to a radar PTH controller, an antenna turntable controller and an echo simulation controller; the radar PTH controller is connected to the radar PTH in a manner of control; the antenna turntable controller is connected to the antenna turntable in a manner of control; the echo simulation controller is signal-connected to the signal processor; the host controller sends an expected pan angle and tilt angle of the test radar to the radar PTH through the radar PTH controller, sends an expected pan angle of each antenna in the antenna turntable to the antenna turntable through the antenna turntable controller, and sends a relative distance and speed between the test radar and virtual target vehicles, processed by the signal processor, to the test radar through the antennas;
    the signal acquisition device is connected to the display after being signal-connected to the test radar; the signal acquisition device acquires and stores a detection signal of the test radar, and transmits the detection signal of the test radar to the display for real-time display;
    wherein the antenna turntable controller is configured to control servo motors attached to the antenna turntable via a pulley.

2. The multi-target dynamic simulation test system for a vehicle-mounted MMW radar according to claim 1, wherein:
    the antenna turntable comprises an antenna movement device and the darkroom; the darkroom is located in the antenna movement device, and both the radar PTH and the test radar fixed thereon are placed in the darkroom;
    the antenna movement device comprises antenna turntable small pulleys, antenna turntable synchronous belts, an antenna turntable stand, antenna turntable large pulleys, sliding bearings, wear-resistant washers, antennas, antenna turntable servo motors, an antenna turntable end cover and waveguides; multiple antenna turntable large pulleys are sleeved outside a circumference of a sleeve in the middle of the antenna turntable stand through the sliding bearing; the antenna turntable large pulleys rotate independently with each other; the wear-resistant washer is disposed between end faces of two adjacent antenna turntable large pulleys; the antenna turntable end cover is fixed on the top of the sleeve of the antenna turntable stand, thereby realizing the axial fixation of the antenna turntable large pulleys; there are multiple antenna turntable servo motors fixedly mounted on a vertical stand on one side of the antenna turntable stand, which are corresponding to the antenna turntable large pulleys one to one; an output terminal of each antenna turntable servo motor is coaxially fixed with an antenna turntable small pulley; each antenna turntable small pulley is connected to an antenna turntable large pulley in a manner of transmission through an antenna turntable synchronous belt; antennas are horizontally fixed to the antenna turntable large pulleys in one-to-one correspondence; one end of each antenna passes through the antenna turntable large pulley to enter a wave-absorbing ring inside the sleeve of the antenna turntable stand; the other end of each antenna is connected to the RF input apparatus and the RF output apparatus through a waveguide; and
    the darkroom has a semi-closed cavity composed of multiple wave-absorbing rings and an absorbing wedge; the wave-absorbing rings are mounted from bottom to top on an inner wall of the sleeve of the antenna turntable stand; the absorbing wedge is fixedly mounted on the bottom of the antenna turntable end cover; the radar PTH and the test radar mounted thereon enter the cavity of the darkroom module through a through hole in the middle of the antenna turntable stand.

3. The multi-target dynamic simulation test system for vehicle-mounted MMW radar according to claim 1, wherein:
    the radar PTH comprises a radar clamping device and a radar movement device;
    the radar clamping device comprises a radar clamping baffle, a radar clamping bracket and a radar clamping bottom plate; the radar clamping bracket is vertically fixed on the radar clamping bottom plate; the radar clamping baffle is fixed to a front end of the radar clamping bracket; the radar clamping baffle is opened with matrix distributed strip-shaped mounting holes; the test radar is fixedly mounted on the radar clamping baffle through the strip-shaped mounting holes;
    the radar movement device comprises a panning small pulley, a panning synchronous belt, a thrust ball bearing, a radar PTH end cover, a radar PTH upper turntable, a spline shaft, a tilting small pulley, a tilting servo motor, a panning large pulley, a panning servo motor, a tilting large pulley and a radar PTH lower turntable; the panning large pulley is mounted above the radar PTH upper turntable through the thrust ball bearing; the bottom of the panning large pulley is fixed on the radar PTH upper turntable through the radar PTH end cover to achieve axial fixation, and the panning large pulley is coaxially fixed to the bottom of the radar clamping bottom plate; the panning servo motor is fixed to the radar PTH upper turntable; the panning small pulley is coaxially fixed to an output terminal of the panning servo motor; the panning small pulley is connected to the panning large pulley in a manner of transmission through the panning synchronous belt; the bottom of the radar PTH upper turntable is hinged to the top of the radar PTH lower turntable; the tilting large pulley is connected to the bottom of the radar PTH upper turntable through the spline shaft, and a hinge axis of the radar PTH upper turntable and the radar PTH lower turntable is collinear with an axis of the spline shaft; an outer casing of the tilting servo motor is fixed on a base of the radar PTH lower turntable; the tilting small pulley is coaxially fixed to an output terminal of the tilting servo motor; the tilting small pulley is connected to the tilting large pulley in a manner of transmission through the tilting synchronous belt; and the tilting servo motor and the panning servo motor are respectively signal-connected to the radar PTH controller.

4. A multi-target dynamic simulation test system for vehicle-mounted millimeter-wave (MMW) radar, comprising:

an antenna turntable, a radar pan-and-tilt head (PTH), a radar echo simulation device, a control device, a signal acquisition device and a display, wherein:

a test radar is mounted on the radar PTH and driven by the radar PTH to pan or tilt; the test radar is placed in a darkroom of the antenna turntable; antennas are driven by the antenna turntable to pan;

the radar echo simulation device includes a radio frequency (RF) input apparatus, a signal processor and a RF output apparatus which are signal-connected in order; the RF input apparatus and the RF output apparatus are respectively signal-connected to the antennas;

the control device comprises a host controller which is respectively connected to a radar PTH controller, an antenna turntable controller and an echo simulation controller; the radar PTH controller is connected to the radar PTH in a manner of control; the antenna turntable controller is connected to the antenna turntable in a manner of control; the echo simulation controller is signal-connected to the signal processor; the host controller sends an expected pan angle and tilt angle of the test radar to the radar PTH through the radar PTH controller, sends an expected pan angle of each antenna in the antenna turntable to the antenna turntable through the antenna turntable controller, and sends a relative distance and speed between the test radar and virtual target vehicles, processed by the signal processor, to the test radar through the antennas;

the signal acquisition device is connected to the display after being signal-connected to the test radar; the signal acquisition device acquires and stores a detection signal of the test radar, and transmits the detection signal of the test radar to the display for real-time display;

the radar PTH comprises a radar clamping device and a radar movement device;

the radar clamping device comprises a radar clamping baffle, a radar clamping bracket and a radar clamping bottom plate; the radar clamping bracket is vertically fixed on the radar clamping bottom plate; the radar clamping baffle is fixed to a front end of the radar clamping bracket; the radar clamping baffle is opened with matrix distributed strip-shaped mounting holes; the test radar is fixedly mounted on the radar clamping baffle through the strip-shaped mounting holes;

the radar movement device comprises a panning small pulley, a panning synchronous belt, a thrust ball bearing, a radar PTH end cover, a radar PTH upper turntable, a spline shaft, a tilting small pulley, a tilting servo motor, a panning large pulley, a panning servo motor, a tilting large pulley and a radar PTH lower turntable; the panning large pulley is mounted above the radar PTH upper turntable through the thrust ball bearing; the bottom of the panning large pulley is fixed on the radar PTH upper turntable through the radar PTH end cover to achieve axial fixation, and the panning large pulley is coaxially fixed to the bottom of the radar clamping bottom plate; the panning servo motor is fixed to the radar PTH upper turntable; the panning small pulley is coaxially fixed to an output terminal of the panning servo motor; the panning small pulley is connected to the panning large pulley in a manner of transmission through the panning synchronous belt; the bottom of the radar PTH upper turntable is hinged to the top of the radar PTH lower turntable; the tilting large pulley is connected to the bottom of the radar PTH upper turntable through the spline shaft, and a hinge axis of the radar PTH upper turntable and the radar PTH lower turntable is collinear with an axis of the spline shaft; an outer casing of the tilting servo motor is fixed on a base of the radar PTH lower turntable; the tilting small pulley is coaxially fixed to an output terminal of the tilting servo motor; the tilting small pulley is connected to the tilting large pulley in a manner of transmission through the tilting synchronous belt; and the tilting servo motor and the panning servo motor are respectively signal-connected to the radar PTH controller.

\* \* \* \* \*